No. 727,858. PATENTED MAY 12, 1903.
H. A. STIER.
HOSE OR PIPE COUPLING.
APPLICATION FILED MAY 16, 1902.
NO MODEL.
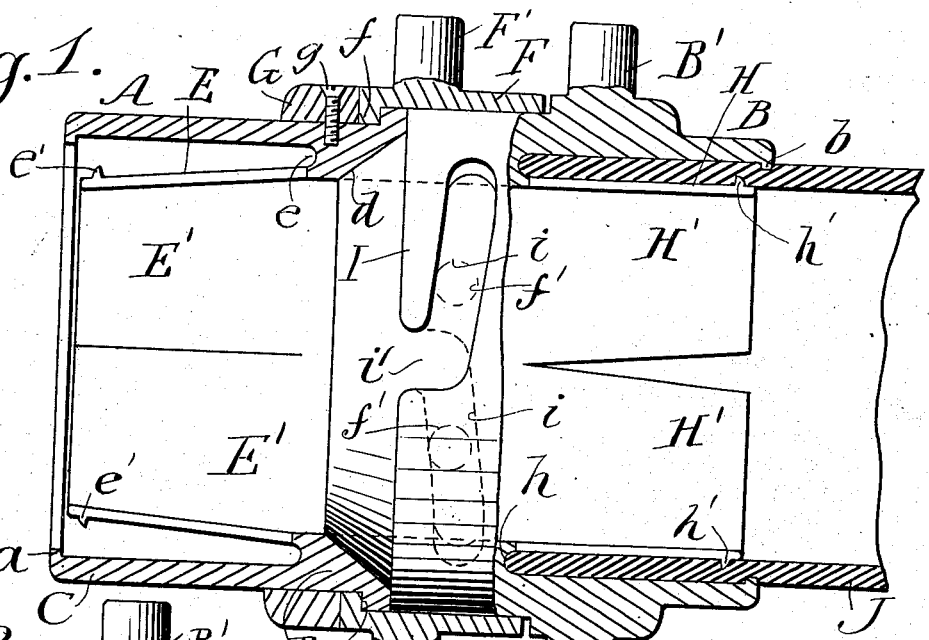
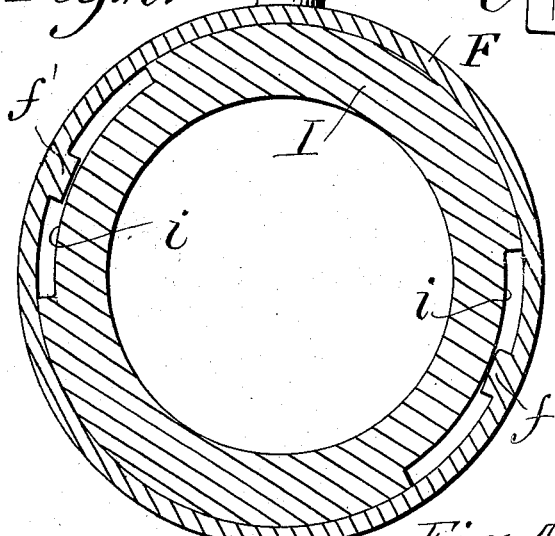
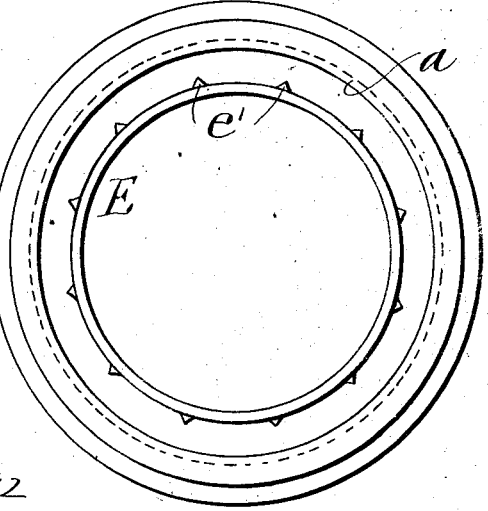
WITNESSES:
B. Patterson
E. Blohm
INVENTOR
H. A. Stier
BY
Cox & Deemer &c
ATTORNEYS No. 727,858.

Patented May 12, 1903.

UNITED STATES PATENT OFFICE.

HENRY AUGUST STIER, OF WARREN, PENNSYLVANIA.

HOSE OR PIPE COUPLING.

SPECIFICATION forming part of Letters Patent No. 727,858, dated May 12, 1903.

Application filed May 16, 1902. Serial No. 107,573. (No model.)

*To all whom it may concern:*

Be it known that I, HENRY AUGUST STIER, a citizen of the United States, and a resident of Warren, county of Warren, and State of Pennsylvania, have invented certain new and useful Improvements in Hose or Pipe Couplings, of which the following is a specification, reference being had to the accompanying drawings, forming a part thereof, in which similar letters of reference indicate corresponding parts.

The subject of the present invention is a hose and pipe coupling, and has for its prominent objects to secure a highly effective connection between hose and pipe lengths, ready application and detachment of the coupling, and simplicity and durability of the parts generally.

With the above purposes in view the improved coupling comprises an independent collar with provision for securing it to the end of a hose or pipe section and having internal studs and designed for the reception of the extended portion of a cylindrical member carried on the end of the other length of hose or pipe, said extended portion being provided with obliquely-disposed slots having open approaches into which the collar-studs enter to effectively establish the coupling when a relative rotation occurs between the collar and slotted portion.

There are other important features and details connected with the novel coupling, which are also fully explained in the subsequent detailed description.

In the accompanying drawings, forming part of this specification, Figure 1 is a longitudinal sectional view showing the invention adapted for service as a hose-coupling. Fig. 2 is a vertical transverse section of the coupling shown in Fig. 1, the section being taken in the plane of the engaging studs and slots. Fig. 3 is an end view of the left-hand member of the coupling; and Fig. 4 is a longitudinal sectional view showing, on a smaller scale, the invention adapted as a pipe-coupling.

Referring now more particularly to the construction disclosed in Figs. 1 to 3, inclusive, the coupling comprises two cylindrical members A B, the body C of the former of which is of suitable thickness to confer strength. At its outer end this body is provided with an inwardly-extending annular ledge $a$, while at its inner part the metal is thickened, as indicated at D, to provide for the external annular shoulder $c$ and inner beveled orifice $d$. Integrally with the thickened part D is the thin conical shell E, concentrically within the body C and contracting toward the outer end of the body. At the juncture of the shell with the part D a rounded socket $e$ is formed. The shell is longitudinally divided to constitute a series of tongues E', each of which is externally provided near its free end with radially-projecting spurs $e'$, or the shell may be solid, as shown by Fig. 3.

F designates a circular collar having at one end a short inwardly-extending flange $f$, the collar being of such dimension that when slipped upon the member A its flange will engage with the shoulder $c$ thereof, the collar being revolubly confined in position by a ring G, snugly embracing the body of the member A and positively secured against relative movement by a screw $g$, tapped through the same and engaging a threaded recess therefor in the member body.

The member B likewise has an integral inner conical shell H, longitudinally divided to constitute tongues H', with external spurs $h'$ near their free ends. A rounded socket $h$ is also located at the junction of the shell with the body metal of the member.

It will be observed in Fig. 1 that the member B has considerable body metal and presents a cylindrical extension I, provided with diametrically-located oblique slots $i$, each having a mouth or open approach $i'$ in a diametrical plane with the approach of the other slot.

Oppositely-located internally-projecting radial studs $f'$ are integrally carried by the collar.

In use the member B will be firmly secured in the end of a length J of hose, as follows: With the tongues H' disposed to present the conical formation of shell H adequate space will be provided between the latter and the body of the member B wherein to introduce the end portion of the length of hose, such end portion being longitudinally crowded into position until its extremity bears and snugly conforms within the socket $h$. With the hose thus conditioned an expanding-tool is introduced within the shell H and the tongues H' outwardly spread to cause them to rigidly clamp the hose against the member-body, the metal composing such shell being sufficiently ductile to permit such expanding operation. Coincident with the latter the spurs $h'$ penetrate the hose material and contribute to prevent longitudinal withdrawal thereof from the member. Similarly the member A is secured to the other length of hose, the end portion of which latter is introduced between the shell E and member-body, crowded so that its end snugly occupies the socket $e$ and positively clamped in position by the radial expansion of the tongues E', so that they bind the hose against the body C and their spurs $e'$ penetrate the hose fabric.

With the members A B secured as described when it is desired to couple the two lengths of hose the collar F is manipulated until its internal studs $f'$ extend in the horizontal part of the slot-approaches $i'$, whereupon the cylindrical extension I of the member B can be moved longitudinally within the collar, so that the studs $f'$ will enter the approaches $i'$ and occupy such position that a rotation of the collar will result in their passing into the slots and their riding contact with the inclined walls of the same, thereby effecting the secure coupling and locking of the members together.

The relation of the parts is such that when the studs have reached the limit of their drawing movement at the closed ends of the slots the inner end of the extension I will be rigidly clamped against the inner bearing presented by the shoulder $c$.

The collar extends sufficiently beyond the transverse plane in which the lugs $f'$ are located that with the extension I partially introduced and held with an inwardly-exerted pressure the collar can be rotated to "feel" the location of the slot-openings $i'$, upon arriving opposite which they will in consequence of the inward pressure on the member B slip into said openings $i'$, and the collar can then be operated to effect the coupling.

Spanner-lugs B' and F' on the member B and collar F, respectively, permit the relative holding and rotation of these parts.

The inwardly-extending ledges $a$ and $b$ of the members A B coact with the expanded tongues E' H' to bind the hose to the members and promote a water and gas tight connection between the hose and such parts.

From the foregoing description it will be seen that besides being easily and securely applied to the hose, extremely durable, and readily coupled and uncoupled the novel coupling is of extremely simple construction, as it involves besides the ordinary screw $g$ but four independent parts—the two members, collar F, and retaining-ring G.

In Fig. 4 the invention is shown as adapted to serve as a pipe-coupling. In such arrangement the member $A^2$ is presented by a nipple interiorly threaded to screw onto one end of a length of pipe, said nipple having at its inner end the external shoulder $c^2$, which is engaged by the inwardly-extending end flange $f^2$ of the collar $F^2$, revolubly held in position by the ring $G^2$, secured by the screw $g^2$. The opening at the inner end of the nipple is beveled, as indicated at $d^2$, which, as also the bevel $d$ in the primarily-described construction, avoid the obstruction to the fluid flow at such point. The correspondingly-threaded nipple $B^2$ is to be screwed onto the other length of pipe and is provided with the enlarged cylindrical extension $I^2$, adapted to snugly enter the collar $F^2$ and having the oblique slots $i^2$ with open approaches $i^3$ for the reception and engagement of the diametrically-located inner studs $f^3$ of the collar to effect the drawing and coupling of the members together. It will therefore be appreciated that in its general features the improved coupling is readily adaptable for effecting a variety of connections.

I do not desire to be understood as limiting myself to the particular construction and arrangement of parts shown and described, but reserve the right to such modifications as are within the scope of my invention, and I wish it particularly understood that the expansible shells may be formed solid or they may embody a series of tongues.

Having now described my invention, what I claim as new, and desire to secure by Letters Patent, is—

A hose-coupling consisting of the sections A and B, the section A, having a body C, an inwardly-extending annular edge $a$, a shoulder $c$, and an inner shell E, having spurs $e'$, the section B, formed with an inner shell H', having spurs $h'$, and an extension I, formed with diagonal slots $i$, having approaches $i'$, and the collar F, revolubly fastened upon the section A, having inwardly-projecting pins $f'$, to engage said slots and close said coupling and spanner-lugs on said collar and said part B, to add facility for closing and separating said sections.

In testimony that I claim the foregoing as my invention I have signed my name, in presence of two witnesses, this 5th day of February, 1902.

HENRY AUGUST STIER.

Witnesses:
ALBERT H. WHITESHOT,
JOHN CLAYTON.